(12) United States Patent
Wang

(10) Patent No.: US 11,926,704 B2
(45) Date of Patent: Mar. 12, 2024

(54) POLYIMIDE SUBSTRATE, MANUFACTURING METHOD THEREOF, AND DISPLAY SUBSTRATE HAVING SAME

(71) Applicant: WUHAN CHINA STAR OPTOELECTRONICS SEMICONDUCTOR DISPLAY TECHNOLOGY CO., LTD., Wuhan (CN)

(72) Inventor: Yamin Wang, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 475 days.

(21) Appl. No.: 17/261,427

(22) PCT Filed: Jun. 29, 2020

(86) PCT No.: PCT/CN2020/098727
§ 371 (c)(1),
(2) Date: Jan. 19, 2021

(87) PCT Pub. No.: WO2021/196431
PCT Pub. Date: Oct. 7, 2021

(65) Prior Publication Data
US 2022/0106443 A1 Apr. 7, 2022

(30) Foreign Application Priority Data
Apr. 1, 2020 (CN) .......................... 202010251119.1

(51) Int. Cl.
C08G 73/10 (2006.01)

(52) U.S. Cl.
CPC ..... *C08G 73/1042* (2013.01); *C08G 73/1039* (2013.01); *C08G 73/1071* (2013.01); *C08G 73/1085* (2013.01)

(58) Field of Classification Search
CPC ............ C08G 73/1042; C08G 73/1039; C08G 73/1071; C08G 73/1085
(Continued)

(56) References Cited

U.S. PATENT DOCUMENTS 4,978,733 A 12/1990 Khanna
2007/0106056 A1 5/2007 Itatani

FOREIGN PATENT DOCUMENTS

CN 102634021 A 8/2012
CN 105566630 A 5/2016
(Continued)

Primary Examiner — Ruiyun Zhang
(74) Attorney, Agent, or Firm — The Roy Gross Law Firm, LLC; Roy Gross

(57) ABSTRACT

A polyimide substrate, a manufacturing method thereof, and a display substrate having same are disclosed. The method for manufacturing the polyimide substrate comprises steps of: providing a diamine containing a dioxazole structure; polymerizing a fluorine-containing dianhydride with the diamine containing the dioxazole structure to form a polyamic acid containing oxazole and fluorine; and cyclodehydrating the polyamic acid containing oxazole and fluorine to produce a polyimide containing oxazole and fluorine, followed by forming the polyimide substrate by film formation of the polyimide containing oxazole and fluorine. Thus, a light transmission performance of the polyimide substrate is improved.

14 Claims, 3 Drawing Sheets

| Providing a diamine containing a dioxazole structure | ~S11 |

| Polymerizing a fluorine-containing dianhydride with the diamine containing the dioxazole structure to form a polyamic acid containing oxazole and fluorine | ~S12 |

| Cyclodehydrating the polyamic acid containing oxazole and fluorine to produce a polyimide containing oxazole and fluorine, and forming a polyimide substrate by film formation of the polyimide containing oxazole and fluorine | ~S13 |

(58) Field of Classification Search
USPC .................................................. 428/1.1, 1.2
See application file for complete search history.

(56) References Cited

FOREIGN PATENT DOCUMENTS

| | | | | | |
|---|---|---|---|---|---|
| CN | 107405907 | A | * | 11/2017 | ............. B32B 27/08 |
| CN | 107892745 | A | | 4/2018 | |
| CN | 110643040 | A | | 1/2020 | |
| CN | 111303423 | A | | 6/2020 | |
| EP | 0387062 | A2 | | 9/1990 | |

* cited by examiner

POLYIMIDE SUBSTRATE, MANUFACTURING METHOD THEREOF, AND DISPLAY SUBSTRATE HAVING SAME

CROSS REFERENCE TO RELATED APPLICATIONS

This application is a National Phase of PCT Patent Application No. PCT/CN2020/098727 having International filing date of Jun. 29, 2020, which claims the benefit of priority of Chinese Application No. 202010251119.1 filed Apr. 1, 2020. The contents of the above applications are all incorporated by reference as if fully set forth herein in their entirety.

FIELD OF INVENTION

The present disclosure relates to the technical field of material and the technical field of flexible display, and especially relates to a polyimide (PI) substrate, manufacturing method thereof, and display substrate having same.

BACKGROUND OF INVENTION

Along with the development of society and the progress of technology, screen display has increasingly adopted for transmission of information. This brings an opportunity for the development of flexible display technology. Organic light-emitting diode (OLED) flexible display panel is taken as an example, which is the most popular in recent years. An OLED flexible display panel comprises a flexible substrate and layers of structures, such as anodes or thin film transistors (TFTs), formed on the substrate. In prior art, the layers of structures are usually formed by sputtering film forming processes. The sputtering film forming processes require effective resistance of the flexible substrate to high temperatures. To meet the requirement of the resistance to high temperatures, polyimide is usually used in the industry to manufacture the fixable substrate (namely, polyimide substrate). However, conjugated structures in polyimide molecules form compact interchain accumulation, resulting in poor light transmission performance of the polyimide substrate in visible light bands.

Technical Problem

The present polyimide substrate has poor light transmission performance.

SUMMARY OF INVENTION

Technical Solutions

The present disclosure provides a method for manufacturing a polyimide substrate, comprising steps of:
providing a diamine containing a dioxazole structure;
polymerizing a fluorine-containing dianhydride with the diamine containing the dioxazole structure to form a polyamic acid containing oxazole and fluorine; and
cyclodehydrating the polyamic acid containing oxazole and fluorine to produce a polyimide containing oxazole and fluorine, and forming the polyimide substrate by film formation of the polyimide containing oxazole and fluorine.

The present disclosure also provides a polyimide substrate, wherein a main material of the polyimide substrate includes a polyimide containing oxazole and fluorine.

The present disclosure further provides a display panel comprising the aforementioned polyimide substrate.

Beneficial Effects

In the present disclosure, the polyamic acid containing oxazole and fluorine is formed by polymerizing the fluorine-containing dianhydride with the diamine containing the dioxazole structure, and the polyimide substrate containing oxazole and fluorine is formed by cyclodehydration and film formation of the polyamic acid containing oxazole and fluorine. The dioxazole structure can reduce a force between the polyamic acid and the polyamic acid molecules formed by the cyclodehydration of the polyamic acid, thereby reducing a crystallinity of the polyimide. In addition, highly electronegative fluorine atoms effectively reduce the conjugated effect between the polyimide molecules, thereby avoiding conjugated structures in the polyimide molecules to form compact interchain accumulation, and thus improving the light transmission performance of the polyimide substrate.

DETAILED DESCRIPTION OF PREFERRED EMBODIMENTS

The technical solutions in the embodiments of the present disclosure are clearly and completely described as follows with reference to the accompanying drawings in the embodiments. It is apparent that the described embodiments are only a part of the embodiments of the present disclosure, and not all of the embodiments. All other embodiments obtained by a person skilled in the art based on the embodiments of the present disclosure without inventive efforts are within the scope of the present disclosure. The following embodiments and the technical features of the embodiments can by combined with each other when the embodiments and the technical features of the embodiments do not conflict with each other.

Figure 1:
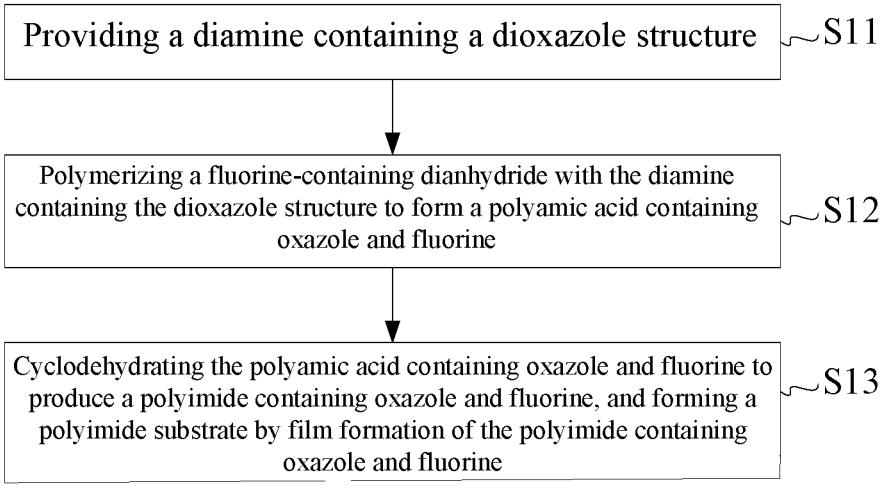
FIG. 1 is a schematic flow chart of a first embodiment of a method for manufacturing a polyimide substrate of the present disclosure.

FIG. 1 is a schematic flow chart of a first embodiment of a method for manufacturing a polyimide substrate of the present disclosure. The method for manufacturing the polyimide substrate comprises steps of S11 to S13.

Step S11: providing a diamine containing a dioxazole structure.

Step S12: polymerizing a fluorine-containing dianhydride with the diamine containing the dioxazole structure to form a polyamic acid containing oxazole and fluorine.

Step S13: cyclodehydrating the polyamic acid containing oxazole and fluorine to produce a polyimide containing oxazole and fluorine, and forming the polyimide substrate by film formation of the polyimide containing oxazole and fluorine.

Wherein, the dioxazole structure can reduce a force between the polyamic acid molecules, thereby reducing a crystallinity of the polyimide. In addition, highly electronegative fluorine atoms effectively reduce the conjugated effect between the polyimide molecules, thereby avoiding the conjugated structures in the polyimide molecules to form compact interchain accumulation, and thus improving the light transmission performance of the polyimide substrate.

In a specific embodiment, a chemical formula of the diamine containing the dioxazole structure may be as follows:

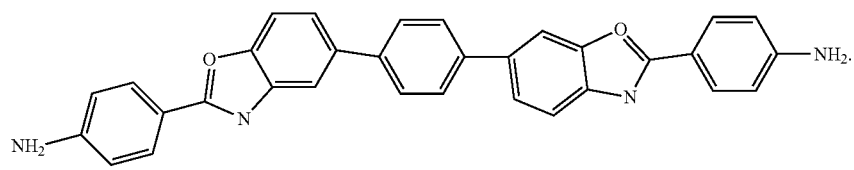

The fluorine-containing dianhydride includes fluoric dianhydride, and a chemical formula of the fluoric dianhydride is as follows:

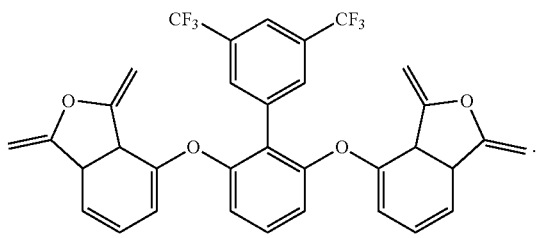

Using the fluoric dianhydride as an example, the principle and process of manufacturing the polyimide substrate are described in detail hereinbelow.

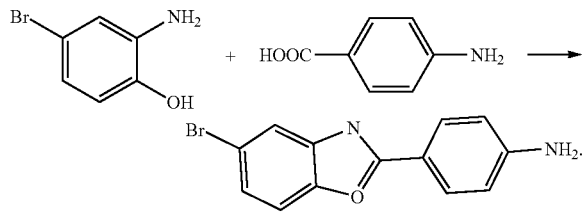

In an exemplary scenario, a chemical, which is the 2-amino-4-bromophenol, dissolved by methylene chloride ($CH_2Cl_2$) is first added under the protection of nitrogen gas.

A methylene chloride solution of the 4-aminobenzoic acid is then added at room temperature. The mixture is agitated continuously. After the 2-amino-4-bromophenol reacts with the 4-aminobenzoic acid reacts for 3 to 12 hours, the reaction solution is well-agitated with sodium sulfate anhydrous ($Na_2SO_4$), then left to stand, then extracted with the methylene chloride, and precipitated to form white solids by using ethanol. The white solids are dried to obtain the 4-amino-6-bromobenzoxazole.

Step S22: reacting the 4-amino-6-bromobenzoxazole with phenylboronic acid to form the diamine containing the dioxazole structure.

The chemical reaction process of reacting the 4-amino-6-bromobenzoxazole with the phenylboronic acid to form the diamine containing the dioxazole structure is illustrated as follows:

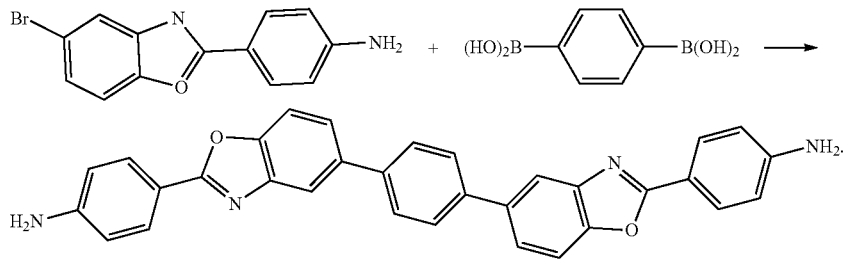

Figure 2:
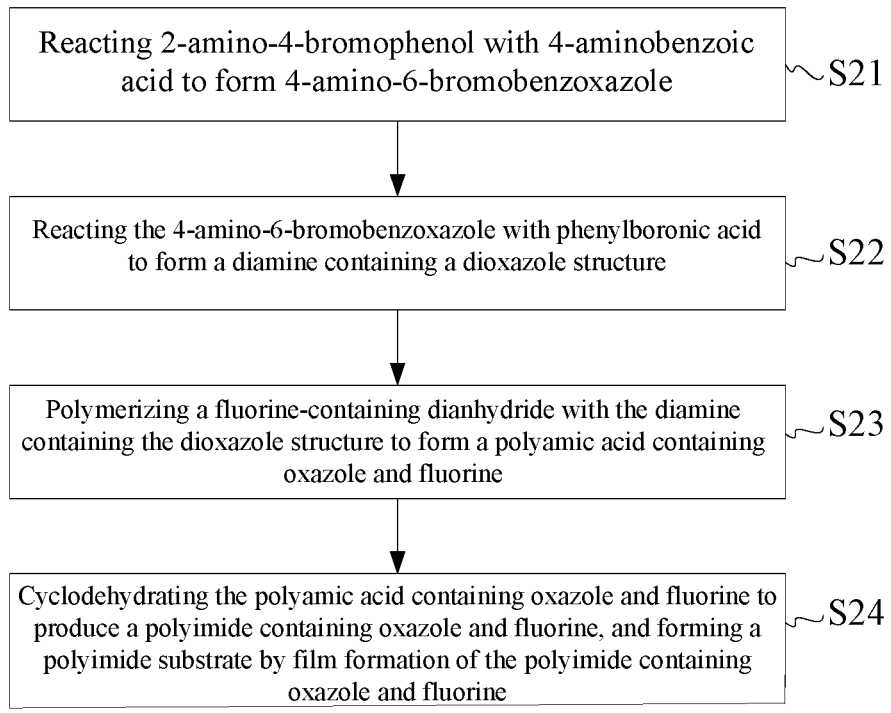
FIG. 2 is a schematic flow chart of a second embodiment of the method for manufacturing the polyimide substrate of the present disclosure.

FIG. 2 is a schematic flow chart of a second embodiment of the method for manufacturing the polyimide substrate of the present disclosure. The method for manufacturing the polyimide substrate comprises steps of 21 to S24, as shown in FIG. 2.

Step S21: reacting 2-amino-4-bromophenol with 4-aminobenzoic acid to form 4-amino-6-bromobenzoxazole.

The chemical reaction process of reacting the 2-amino-4-bromophenol with the 4-aminobenzoic acid to form the 4-amino-6-bromobenzoxazole is illustrated as follows:

In an exemplary scenario, 0.05 to 5.6 mol (mole) of the phenylboronic acid, 0.02 to 6.9 mol of the 4-amino-6-bromobenzoxazole, and 0.01 to 2.5 mol of potassium carbonate are added to a round bottom flask under the protection of argon gas, dissolved in dimethylformamide (DMF) solvent, agitated continuously for 2 hours, and then heated to 40 to 70° C. A tetrakis(triphenylphosphine)palladium catalyst is added, wherein the amount of the catalyst added is from 0.01 to 0.09 mol. The solution is further heated to 80 to 100° C. and reacts for 24 to 96 hours before cooled down to room temperature. Deionized water is used for cleaning to remove large amounts of water-soluble impurity ions. Finally, the diamine containing the dioxazole structure is obtained by suction filtration and drying.

Step S23: polymerizing the fluorine-containing dianhydride with the diamine containing the dioxazole structure to form the polyamic acid containing oxazole and fluorine.

In an exemplary scenario, 1 to 1.5 mol of the diamine containing the dioxazole structure and N-Methyl-2-pyrrolidone (NMP) solvent are first added to the round bottom flask protected by the argon gas. Wherein the amount of the NMP solvent is added until the diamine containing the dioxazole structure is fully dissolved. For example, the amount is from 20 to 150 ml. 1.2 to 2.5 mol of the fluorine-containing dianhydride is added when the diamine containing the dioxazole structure is fully dissolved. A solution in which polyamic acid containing oxazole and fluorine is dissolved may be obtained after agitating at room temperature continuously for 24 to 96 hours, Step S24: cyclodehydrating the polyamic acid containing oxazole and fluorine to produce the polyimide containing oxazole and fluorine, and forming the polyimide substrate by film formation of the polyimide containing oxazole and fluorine.

After the polyamic acid containing oxazole and fluorine is obtained in the step S23, in an exemplary scenario, 20 to 70 ml of the N-Methyl-2-pyrrolidone is added to the polyamic acid containing oxazole and fluorine, and a solution of the polyamic acid containing oxazole and fluorine is filtered using an organic filter. The filtered solution of the polyamic acid containing oxazole and fluorine is spin-coated onto a glass substrate. The polyimide substrate is produced by cyclodehydrating the polyamic acid containing oxazole and fluorine by a crosslinking curing method.

Specifically, the filtered solution of the polyamic acid containing oxazole and fluorine is placed in a vacuum environment with a constant temperature of 80° C. to remove 70% of the NMP solvent. The solution is then baked in an environment with a high temperature, such as 450° C., and a polyimide film may be obtained. The whole glass substrate and the polyimide film are further soaked in the deionized water for 72 to 96 hours to allow the polyimide film to be freely removed from the glass substrate. The polyimide film is dried again at 80° C., and the polyimide substrate is finally obtained.

Wherein, the baking step in the aforementioned crosslinking curing process may be carried out by a hard baking method or a soft baking method. While the hard baking method is to directly heat the filtered polyamic acid solution to the highest temperature and keep the solution at that constant (highest) temperature for 1 hour before cooling down, the soft baking method is to heat the filtered polyamic acid solution to the highest temperature for 2 or more times before cooling, thereby achieving the crosslinking of the solution and the removal of the NMP solvent in different constant temperature steps.

The main materials of the polyimide substrate prepared in the aforementioned steps of S21 to S24 include the polyimide containing oxazole and fluorine. The dioxazole structure can reduce the force between the polyamic acid molecules, thereby reducing the crystallinity of the polyimide. In addition, the highly electronegative fluorine atoms effectively reduce the conjugated effect between the polyimide molecules, thereby avoiding the conjugated structures in polyimide molecules to form compact interchain accumulation, and thus improving the light transmission performance of the polyimide substrate.

Figure 3:
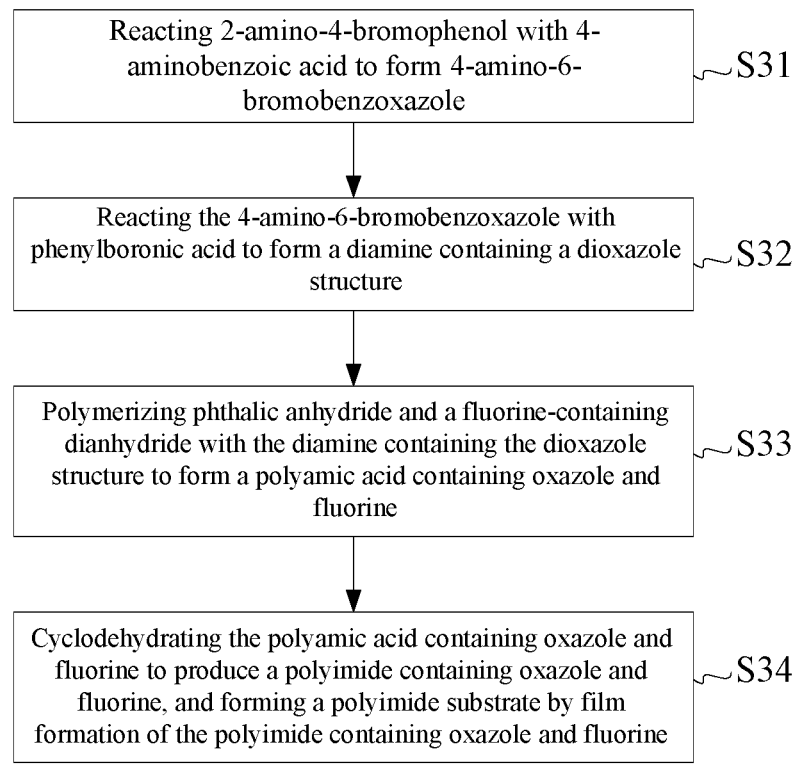
FIG. 3 is a schematic flow chart of a third embodiment of the method for manufacturing the polyimide substrate of the present disclosure.

FIG. 3 is a schematic flow chart of a third embodiment of the method for manufacturing the polyimide substrate of the present disclosure. The method for manufacturing the polyimide substrate comprises steps of S31 to S34, as shown in FIG. 3.

Step S31: reacting the 2-amino-4-bromophenol with the 4-aminobenzoic acid to form the 4-amino-6-bromobenzoxazole.

Step S32: reacting the 4-amino-6-bromobenzoxazole with the phenylboronic acid to form the diamine containing the dioxazole structure.

Step S33: polymerizing phthalic anhydride and the fluorine-containing dianhydride with the diamine containing the dioxazole structure to form the polyamic acid containing oxazole and fluorine.

Step S34: cyclodehydrating the polyamic acid containing oxazole and fluorine to produce the polyimide containing oxazole and fluorine, and forming the polyimide substrate by film formation of the polyimide containing oxazole and fluorine.

Based on the description of the aforementioned embodiments but different in where in the present embodiment, the phthalic anhydride is added to a mixture of the fluorine-containing dianhydride and the diamine containing the dioxazole structure when the fluorine-containing dianhydride is polymerized with the diamine containing the dioxazole structure to form the polyamic acid containing oxazole and fluorine, thereby endcapping the diamine containing the dioxazole structure.

In the step S33, the chemical reaction process of polymerizing the phthalic anhydride and the fluorine-containing dianhydride with the diamine containing the dioxazole structure to form the polyamic acid containing oxazole and fluorine is illustrated as follow:

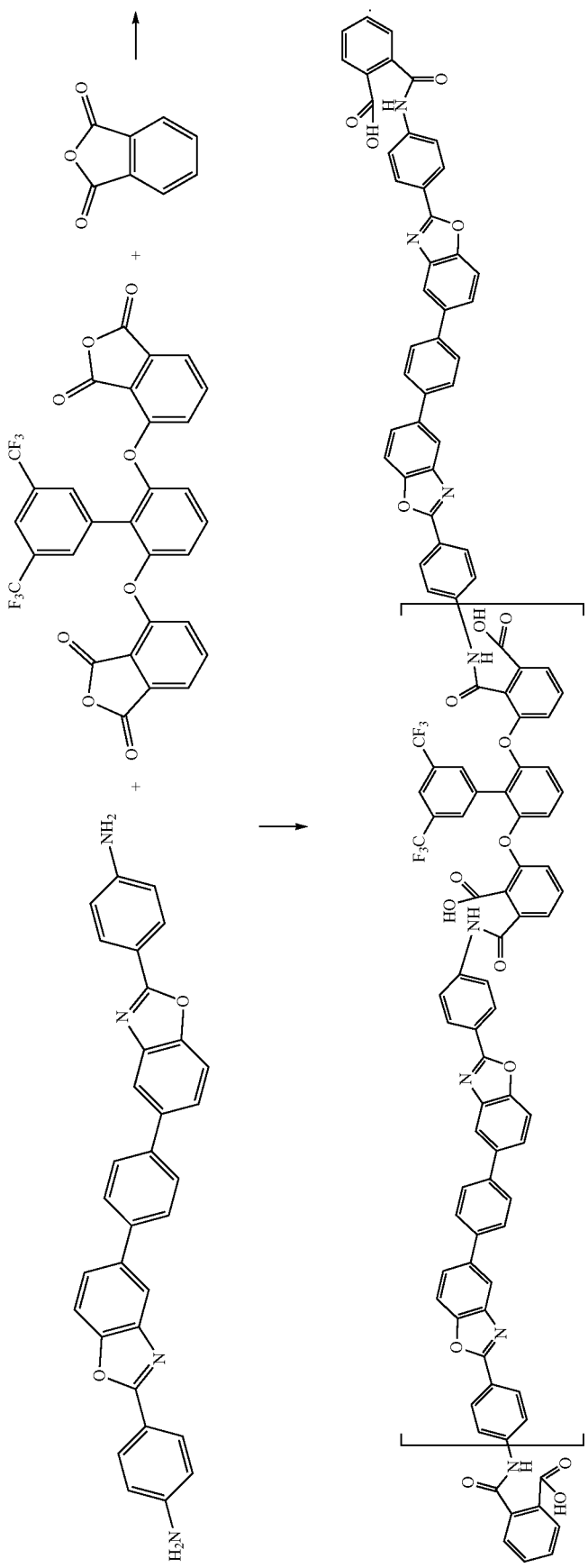

In an exemplary scenario, 1 to 1.5 mol of the diamine containing the dioxazole structure and the N-Methyl-2-pyrrolidone (NMP) solvent are first added to the round bottom flask protected by the argon gas. Wherein the amount of the NMP solvent is added until the diamine containing the dioxazole structure is fully dissolved. For example, the amount is from 20 to 150 ml. 1.2 to 2.5 mol of the fluorine-containing dianhydride is added when the diamine containing the dioxazole structure is fully dissolved. Additionally, 0.01 to 0.2 mol of the phthalic anhydride is added. After agitating at room temperature continuously for 24 to 96 hours, the solution in which polyamic acid containing oxazole and fluorine is dissolved may be obtained.

In the step S34, the chemical reaction process of cyclo-dehydrating the polyamic acid containing oxazole and fluorine to produce the polyimide containing oxazole and fluorine is illustrated as follow:

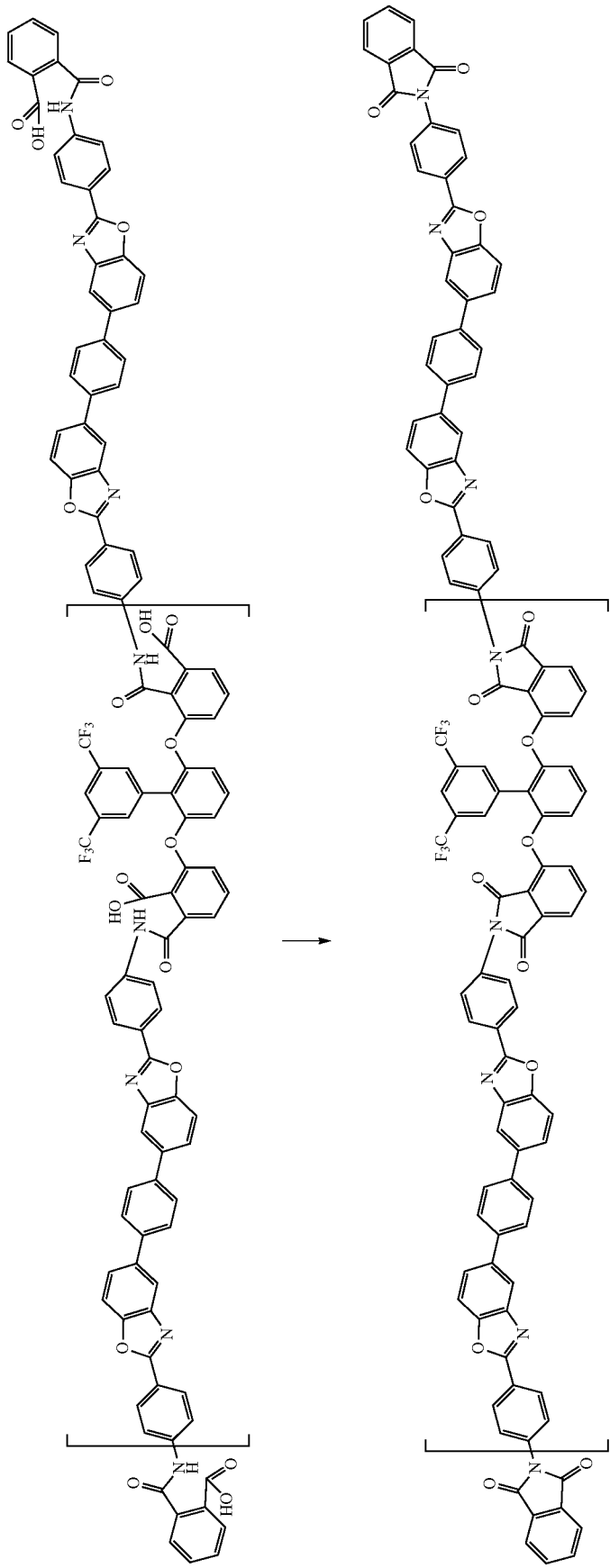

Based on the description of the embodiment described in accompany with the FIG. 2 hereinabove, the present embodiment induces the phthalic anhydride to endcap the polyamic acid and the polyimide, thereby preventing the polymer implosion of the fluorine-containing dianhydride and the diamine containing the dioxazole structure, thereby reducing the force between the polyamic acid molecules, and thereby avoiding polyimide molecules to form compact interchain accumulation, and thus further improving the light transmission performance of the polyimide substrate.

Figure 4:
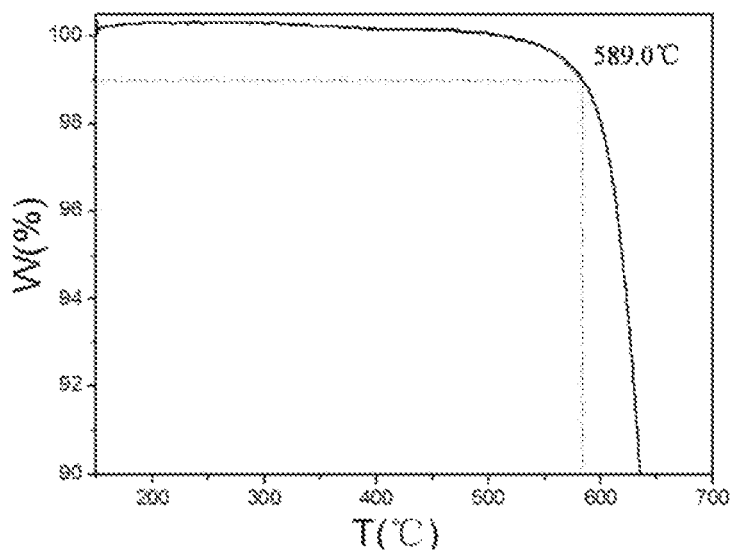
FIG. 4 is a schematic graph of a thermogravimetric curve of a polyimide containing oxazole and fluorine of the present disclosure.

FIG. 4 is a schematic graph of a thermogravimetric curve of the polyimide containing oxazole and fluorine of the present disclosure. As shown in FIG. 4, as temperature T rises, increase of a weight lost rate W of the polyimide substrate is not obvious. The weight lost rate W of the polyimide substrate is only 1% (that is, the substrate loses 1% of its mess) when the temperature T rises to 589.0° C. Therefore, it can be seen that the polyimide substrate of the present disclosure has superior heat resistance.

Figure 5:
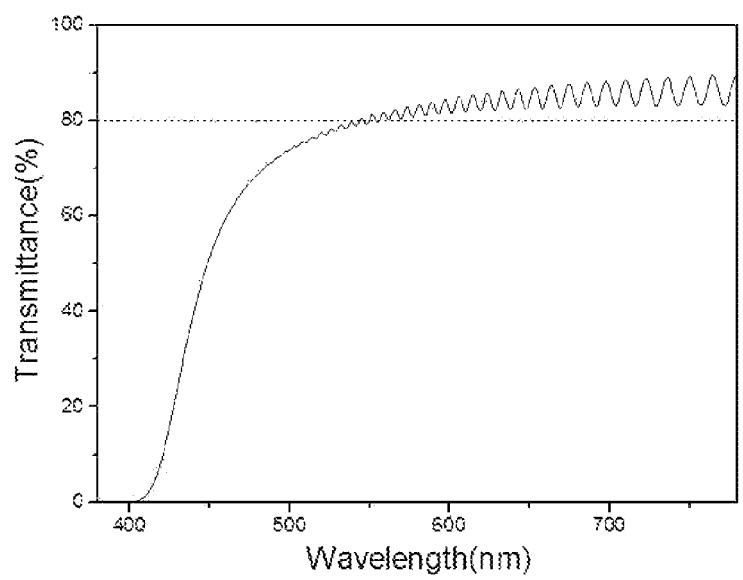
FIG. 5 is a schematic graph of a light transmission performance curve of the polyimide containing oxazole and fluorine of the present disclosure.

FIG. 5 is a schematic graph of a light transmission performance curve of the polyimide containing oxazole and fluorine of the present disclosure. Refer to FIG. 5, a transmittance of the polyimide substrate can reach over 80%, and in most cases 85%, for most wavelengths of light. This can fully meet the needs of 75% light transmittance of a flexible display panel in the present industry.

The present disclosure also provides a display panel of an embodiment. The display panel includes, but is not limited to OLED flexible display panel. The display panel of the present embodiment comprises the polyimide substrate. Certainly, the display panel of the present embodiment may also comprise different layers of structures, such as anode or TFT etc., disposed on the polyimide substrate.

Furthermore, the polyimide substrate may be prepared by the method of any of the foregoing embodiments. The main materials of the polyimide substrate include the polyimide containing oxazole and fluorine. The dioxazole structure can reduce the force between the polyamic acid molecules, thereby reducing the crystallinity of the polyimide. In addition, the highly electronegative fluorine atoms effectively reduce the conjugated effect between the polyimide molecules, thereby avoiding the conjugated structures in polyimide molecules to form compact interchain accumulation, and thus improving the light transmission performance of the polyimide substrate.

For the scenario in which the phthalic anhydride is induced to endcap the polyamic acid and the polyimide, the polyimide substrate obtained may also prevents the polymer implosion of the fluorine-containing dianhydride and the diamine containing the dioxazole structure, thereby also reducing the force between the polyamic acid molecules, and thereby avoiding polyimide molecules to form compact interchain accumulation, and thus further improving the light transmission performance of the polyimide substrate.

Although the present invention is described via one or more embodiments, a person of ordinary skill in the art can come up with equivalent variations and modifications based upon the understanding of the present specification and the accompanying drawings. The present invention includes all such modifications and variations, and is only limited by the scope of the appended claims. In particular, as to the various functions performed by the components described above, the terms used to describe the components are intended to correspond to any component performing the specific functions (e.g., which are functionally equivalent) of the components (unless otherwise indicated), even those which are structurally different from the disclosed structure for performing the functions in the exemplary embodiments in the present specification shown herein.

That is, the above is merely embodiments of the present invention and are not intended to limit the present invention. All structural or process equivalents, such as the combination of the technical features in different embodiments and direct or indirect application in related technical fields, obtained based on the specification and the drawings of the present invention, are within the scope of the present invention.

In addition, in the description of the present disclosure, it is to be understood that the azimuth or positional relationships indicated by the terms "center", "longitudinal", "transverse", "length", "width", "thickness", "upper", "lower", "front", "back", "left", "right", "vertical", "horizontal", "top", "bottom", "inside", "outside", "clockwise", "counterclockwise", etc., are based on the azimuth or positional relationship shown in the drawings, merely for the purpose of assisting and simplify the description, rather than indicating or implying that the indicated device or element must have a specific orientation, and be constructed and operated in a particular orientation. Therefore, these terms cannot be construed as limiting the present disclosure. In addition, in the drawings, units with the same or similar features may be indicated by the same reference number, or may be indicated by different reference number. In addition, the terms "first" and "second" are only used for descriptive purposes, and cannot be understood as indicating or implying relative importance or implicitly indicating the number of technical features indicated. Therefore, the features defined as "first" and "second" may explicitly or implicitly include one or more of the features. In the description of the present disclosure, the meaning of "a plurality of" is two or more unless specifically defined otherwise.

In the present disclosure, the word "exemplary" is used to mean "an example, illustration, or explanation". Any embodiment described as "exemplary" in the present disclosure is not necessarily interpreted as being more preferred or advantageous than other embodiment. In order to enable any person skilled in the art to implement and use this disclosure, the following description is given. In the following description, the details are listed for explanatory purposes. It should be understood that those of ordinary skill in the art may recognize that the present disclosure can be implemented without using these specific details. In other embodiments, well-known structure and processes will not be described in detail to avoid unnecessary details obscuring the description of this disclosure. Therefore, the present disclosure is not intended to be limited to the illustrated embodiments but is consistent with the widest scope of the principals and features disclosed herein.

What is claimed is:

1. A method for manufacturing a polyimide substrate, comprising steps of:
providing a diamine containing a bis(oxazole) structure;
polymerizing a fluorine-containing dianhydride with the diamine containing the bis(oxazole) structure to form a polyamic acid containing oxazole and fluorine; and
cyclodehydrating the polyamic acid containing oxazole and fluorine to produce a polyimide containing oxazole and fluorine, and forming the polyimide substrate by film formation of the polyimide containing oxazole and fluorine, wherein a chemical formula of the polyimide containing oxazole and fluorine is:

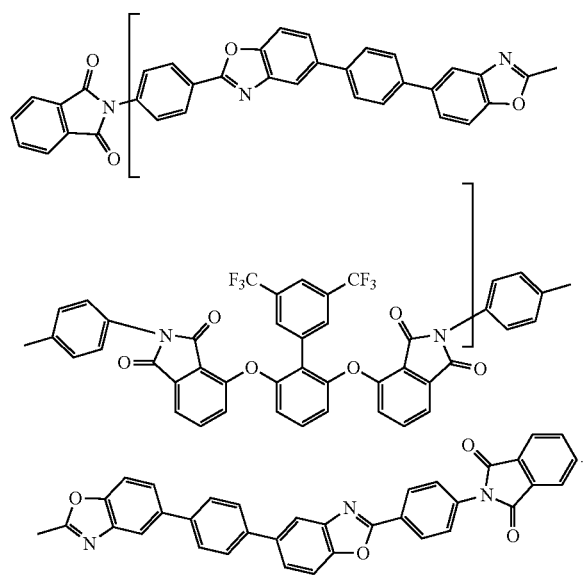

2. The method for manufacturing the polyimide substrate as claimed in claim 1, wherein the step of proving the diamine containing the bis(oxazole) structure comprises steps of:
reacting 2-amino-4-bromophenol with 4-aminobenzoic acid to form 4-amino-6-bromobenzoxazole; and
reacting the 4-amino-6-bromobenzoxazole with phenylboronic acid to form the diamine containing the bis (oxazole) structure.

3. The method for manufacturing the polyimide substrate as claimed in claim 1, wherein the step of polymerizing the fluorine-containing dianhydride with the diamine containing the bis(oxazole) structure to form the polyamic acid containing oxazole and fluorine comprises steps of:
adding phthalic anhydride to a mixture of the fluorine-containing dianhydride and the diamine containing the bis(oxazole) structure, to endcap the diamine containing the bis(oxazole) structure.

4. The method for manufacturing the polyimide substrate as claimed in claim 1, wherein the fluorine-containing dianhydride includes fluoric dianhydride.

5. The method for manufacturing the polyimide substrate as claimed in claim 1, wherein the step of cyclodehydrating the polyamic acid containing oxazole and fluorine to produce the polyimide containing oxazole and fluorine and forming the polyimide substrate by film formation of the polyimide containing oxazole and fluorine comprises steps of:
adding N-Methyl-2-pyrrolidone to a solution of the polyamic acid containing oxazole and fluorine, and filtering the solution of the polyamic acid containing oxazole and fluorine with an organic filter;
spin-coating the filtered solution of the polyamic acid containing oxazole and fluorine onto a glass substrate, and cyclodehydrating the polyamic acid containing oxazole and fluorine by crosslinking curing to produce the polyimide substrate.

6. The method for manufacturing the polyimide substrate as claimed in claim 1, wherein a chemical formula of the diamine containing the bis(oxazole) structure is:

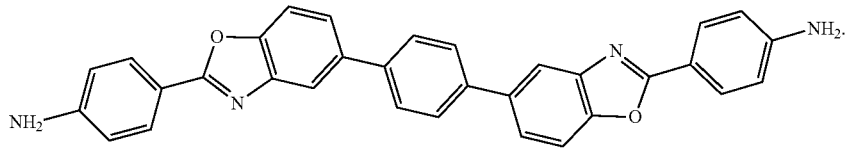 [SMILES: Nc1ccc(-c2nc3cc(-c4ccc(-c5ccc6oc(-c7ccc(N)cc7)nc6c5)cc4)ccc3o2)cc1]

7. A polyimide substrate, wherein a main material of the polyimide substrate includes a polyimide containing oxazole and fluorine, a chemical formula of the polyimide containing oxazole and fluorine is:

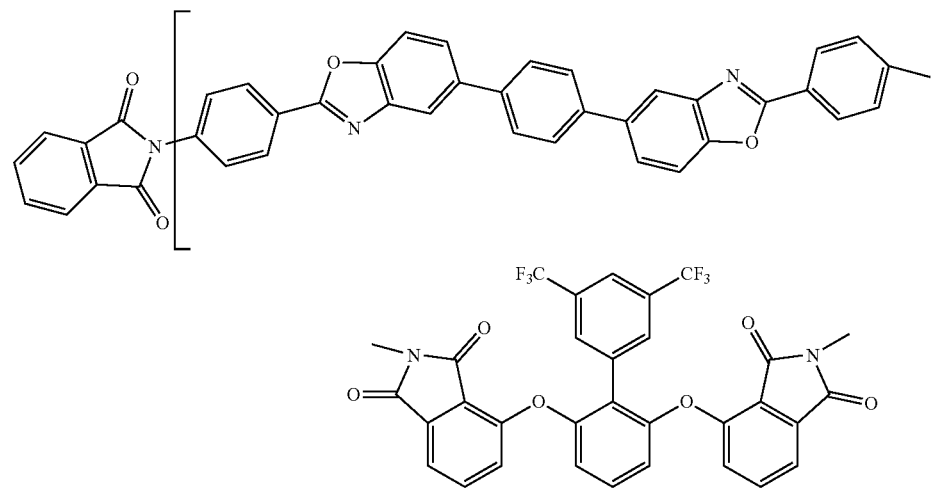

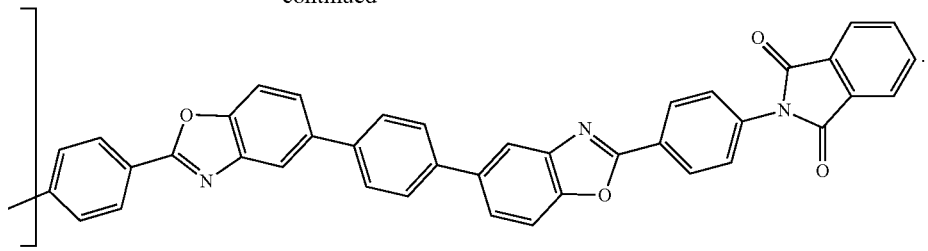

8. The polyimide substrate as claimed in claim 7, wherein the polyimide containing oxazole and fluorine is obtained by cyclodehydrating a polyamic acid containing oxazole and fluorine.

9. The polyimide substrate as claimed in claim 8, wherein the polyamic acid containing oxazole and fluorine is obtained by polymerizing a fluorine-containing dianhydride with a diamine containing a bis(oxazole) structure.

10. The polyimide substrate as claimed in claim 9, wherein a chemical formula of the diamine containing the bis(oxazole) structure is:

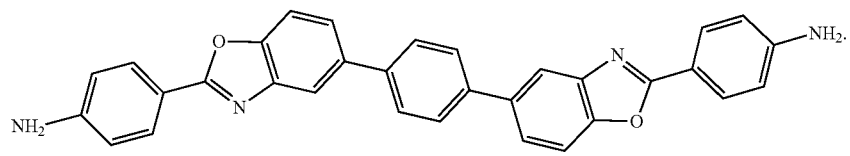 [SMILES: Nc1ccc(-c2nc3cc(-c4ccc(-c5ccc6oc(-c7ccc(N)cc7)nc6c5)cc4)ccc3o2)cc1]

11. A display panel, comprising a polyimide substrate; wherein a main material of the polyimide substrate includes a polyimide containing oxazole and fluorine, a chemical formula of the polyimide containing oxazole and fluorine is:

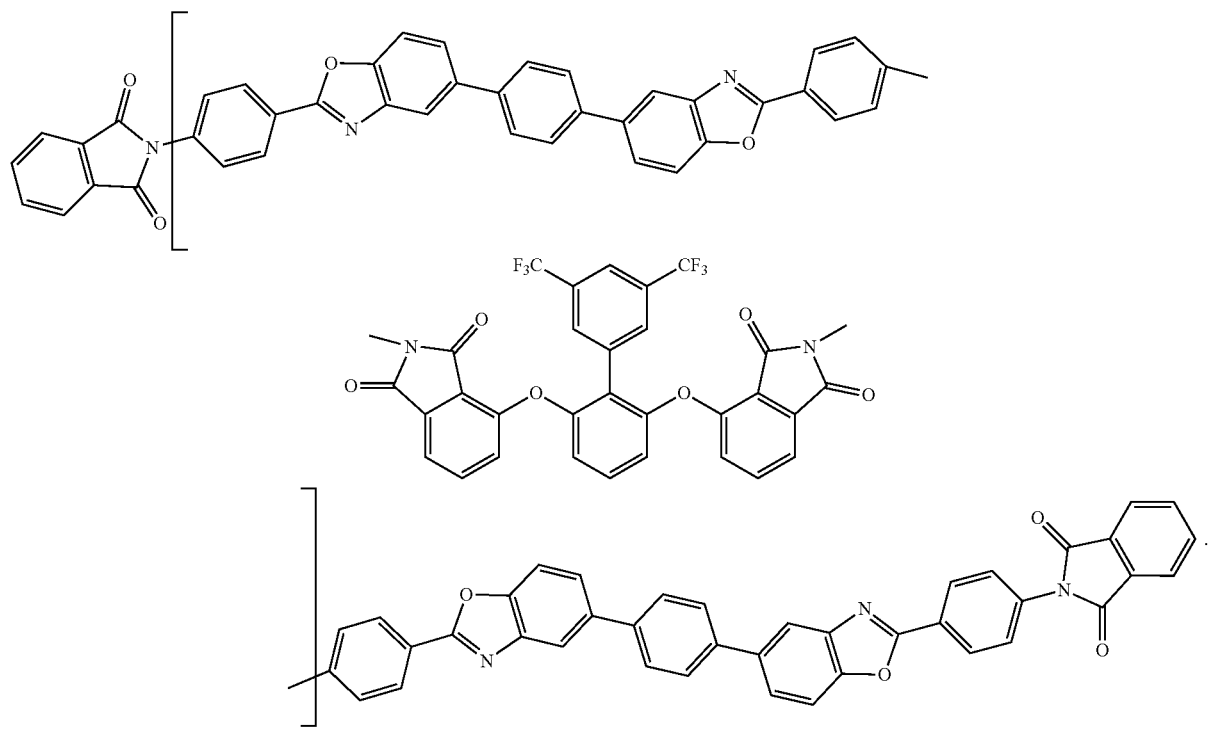

12. The display panel as claimed in claim 11, wherein the polyimide containing oxazole and fluorine is obtained by cyclodehydrating a polyamic acid containing oxazole and fluorine.

13. The display panel as claimed in claim 12, wherein the polyamic acid containing oxazole and fluorine is obtained by polymerizing a fluorine-containing dianhydride with a diamine containing a bis(oxazole) structure.

14. The display panel as claimed in claim 13, wherein a chemical formula of the diamine containing the bis(oxazole) structure is:

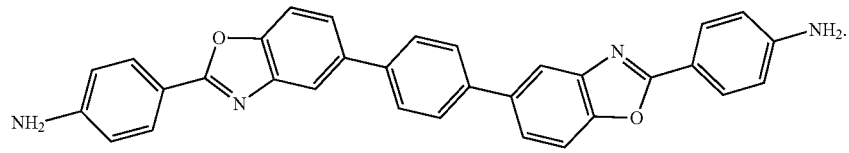 [SMILES: Nc1ccc(-c2nc3cc(-c4ccc(-c5ccc6oc(-c7ccc(N)cc7)nc6c5)cc4)ccc3o2)cc1]

\* \* \* \* \*